United States Patent [19]

Heath

[11] Patent Number: 5,149,040

[45] Date of Patent: Sep. 22, 1992

[54] SIDE BEAM PIPE HANGER AND METHOD OF MAKING

[75] Inventor: Richard W. Heath, Lake Mathews, Calif.

[73] Assignee: Tolco, Incorporated, Corona, Calif.

[21] Appl. No.: 741,722

[22] Filed: Aug. 7, 1991

[51] Int. Cl.$^5$ ............................................... F16L 3/00
[52] U.S. Cl. ...................................... 248/300; 248/59; 403/187; 411/401; 411/427
[58] Field of Search ............ 248/300, 68.1, 58, 62, 248/67.5, 74.4, 74.5, 59, 317; 138/107, 149; 411/400, 401, 427, 437; 403/187

[56] References Cited

U.S. PATENT DOCUMENTS

| 293,009 | 2/1884 | Griffith . | |
|---|---|---|---|
| 1,798,812 | 3/1931 | Rosenbeck | 411/427 X |
| 2,797,606 | 7/1957 | Poupitch | 411/437 |
| 3,006,230 | 10/1961 | McCauley, Jr. | 411/427 |
| 3,211,403 | 10/1965 | Havener . | |
| 3,266,202 | 8/1966 | Furer | 248/58 X |
| 4,379,537 | 4/1983 | Perrault et al. | 411/437 X |
| 4,429,440 | 2/1984 | Laughlin et al. . | |
| 4,473,205 | 9/1984 | Rumble . | |
| 4,479,625 | 10/1984 | Martz . | |
| 4,488,695 | 12/1984 | Rumble . | |

FOREIGN PATENT DOCUMENTS

| 2945065 | 5/1981 | Fed. Rep. of Germany | 248/58 |
|---|---|---|---|
| 652893 | 5/1951 | United Kingdom | 411/437 |

*Primary Examiner*—David L. Talbott
*Attorney, Agent, or Firm*—Knobbe, Martens, Olson & Bear

[57] ABSTRACT

A side beam pipe hanging bracket for principal use in fire sprinkler systems. In the first step of forming the bracket, a generally rectangular shape having an inverted-T-shaped slot, is cut from the metal strip, thereby defining a bolt receiving segment and two hanging segments, one to each side of the bolt receiving segment. The flat bracket is then stamped with threads along the bolt receiving segment, thereby causing the bolt receiving segment to curve and the hanging segments to move laterally toward one another. The hanging segments are then forced further laterally until they overlap one another and holes in each segment are aligned. This motion causes the bolt receiving segment to bend further into a channel with threads around its inner circumference capable of accepting a threaded pipe hanging rod. The bracket is mounted on the vertical surface of a horizontal support by extending a fastener through the overlapped holes in each hanging segment.

22 Claims, 3 Drawing Sheets

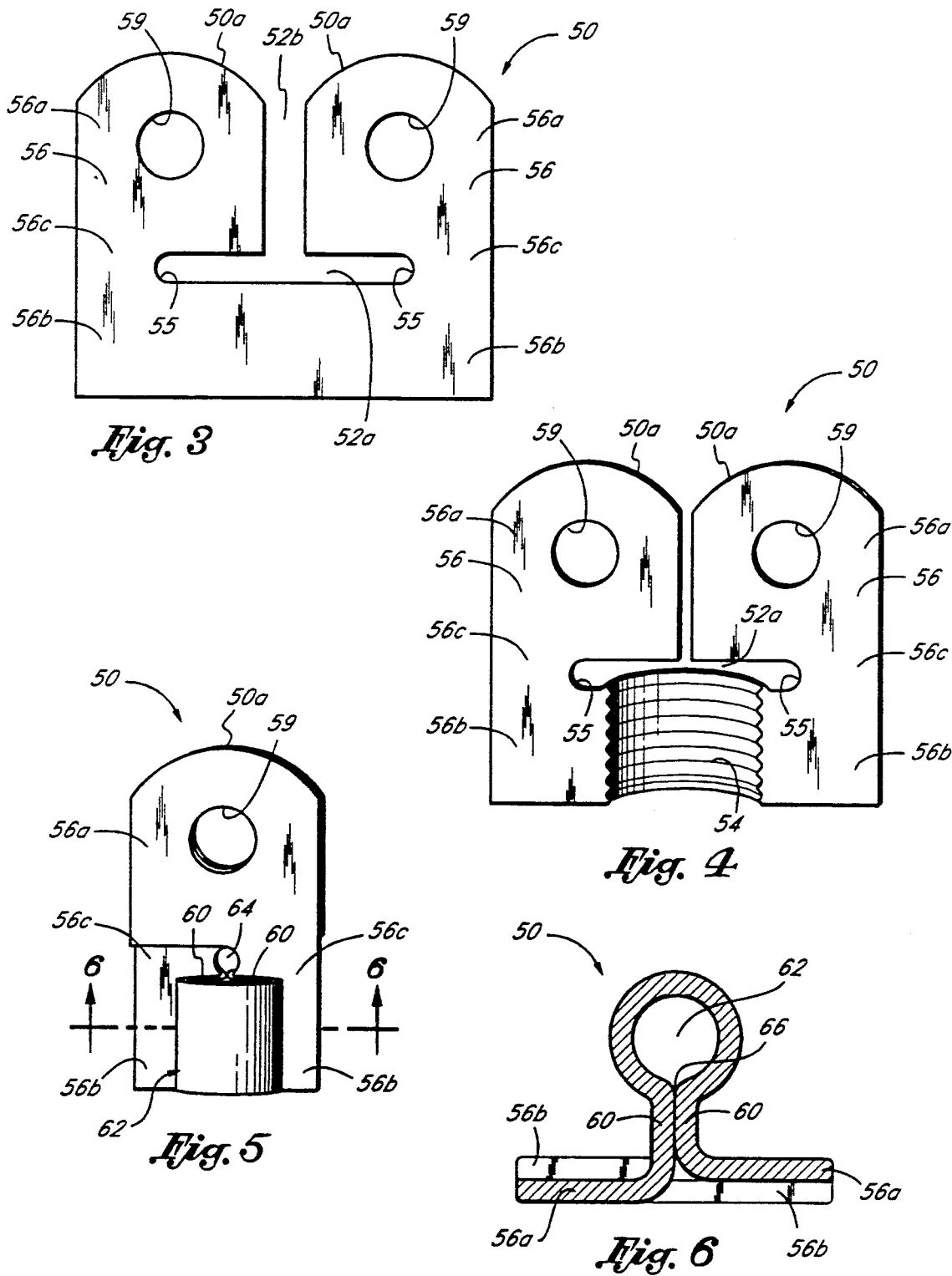

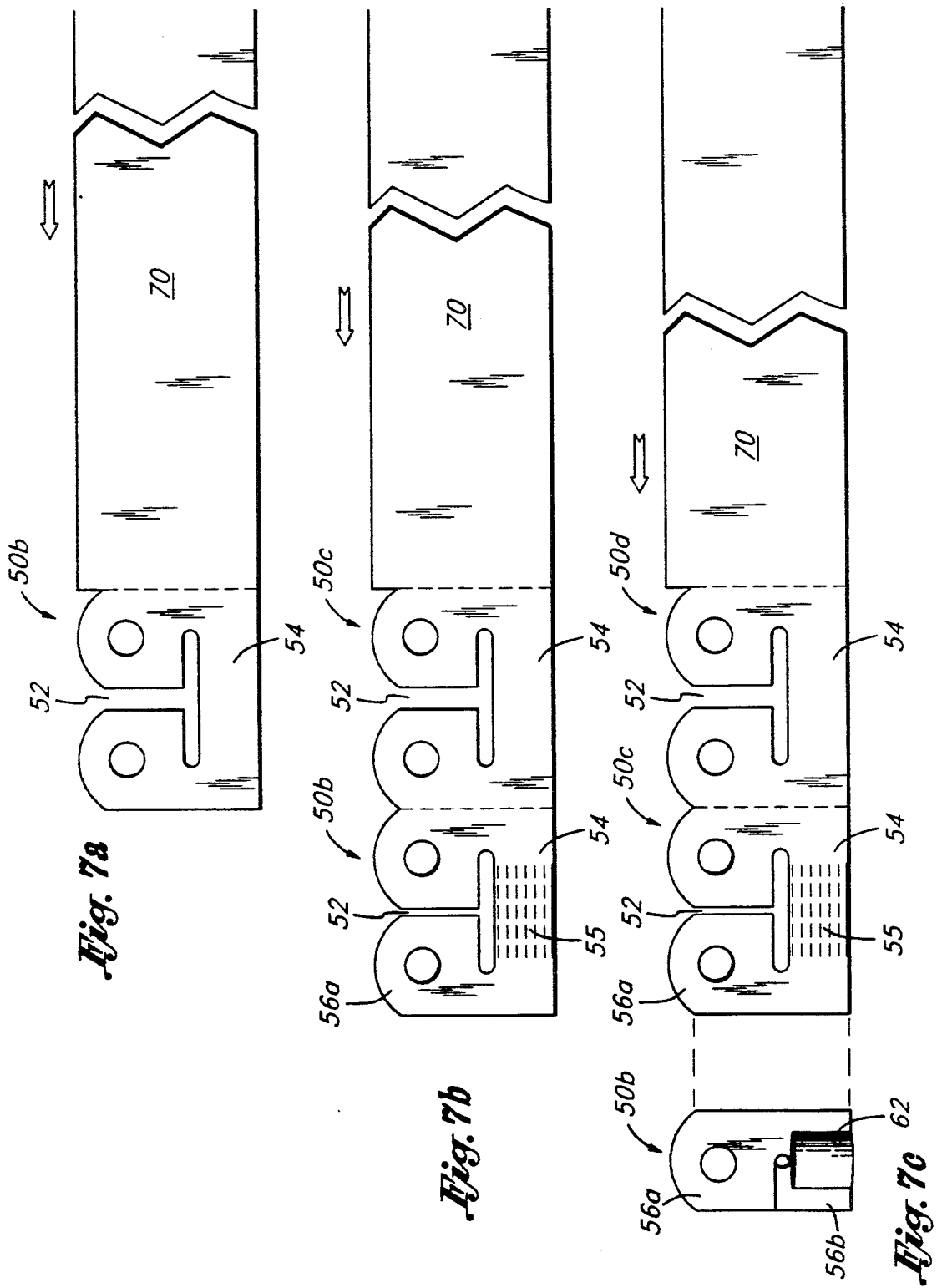

SIDE BEAM PIPE HANGER AND METHOD OF MAKING

FIELD OF THE INVENTION

The present invention relates to pipe hanging apparatus and particularly to brackets which accept hanging rods utilized in suspending liquid carrying pipes, such as those used for interior fire sprinkler systems.

BACKGROUND OF THE INVENTION

Pipes in sprinkler systems are generally hung from an elevated or overhead support, such as a ceiling beam, by pipe hangers. A typical pipe hanger, shown suspending a pipe from a horizontal support in FIG. 1, includes a metal strap bent into a tear drop shape, having two ends which overlap. A pipe hanging rod extends through the overlapping ends to support the unit. The upper portion of the hanger is a yoke, while the lower portion is a saddle in which the liquid carrying pipe rests.

One type of bracket which has traditionally been used to suspend a hanging rod from the vertical surface of an overhead beam is made of solid steel, cast or bent into an L-shape. The bracket is typically quite heavy. One of the legs has an orifice at one end which receives a fastener that attaches the bracket to a support. When the bracket is mounted on the support, the other leg protrudes horizontally from the support. This horizontally extending leg is drilled and threaded to receive a threaded pipe hanging rod. Although the part exceeds the fire sprinkler industry standards for hanging four-inch pipe, the two-step process of drilling and tapping is expensive. This bracket is over-qualified for its intended purpose, making its added expense unnecessary.

Another type of bracket employed to suspend pipes from an overhead support is shown in FIG. 2. This second bracket is typically much lighter than the first bracket discussed above. Protruding from the vertical axis of the bracket are three semicircular holding bands. The top and bottom bands protrude in the same direction while the middle band protrudes in the opposite direction. Thus, the flat side of each band lies in one plane. Each of the three bands is stamped with threads. Extending from the plane which the three holding bands share, is an angled section which leads to a vertical mounting plate with an aperture for receiving a fastener for mounting the bracket to a wall. A hanging rod is threadedly inserted into the channel created by the three offset bands. For proper restraint within the channel, the rod is threadedly inserted until its end aligns with the top of the upper holding band.

This second bracket does not facilitate adjustment of the height at which the liquid carrying pipe is suspended by the hanger. The hanging rod must be inserted a minimum distance into the bracket for proper restraint. Additionally, the rod cannot extend much further than this minimum distance into the bracket due to the angled section which limits vertical motion of the hanging rod into the bracket. Thus, there is a very small range of heights at which a given hanging rod can suspend a pipe.

Additionally, the construction of this lightweight bracket does not compensate adequately for sideloading, or forces which act in a non-vertical direction, on the three holding bands. The three bands are connected to one another and to the mounting plate by only small connecting sections, making these areas susceptible to breakage. A sideload, or force pulling in a direction other than directly downward, can exert a strong force on this weak area of the bracket, thereby causing the bracket to break. Such a non-vertical force might occur, for example, in an earthquake.

Considering brackets used in industries other than fire sprinkler installation, U.S. Pat. No. 239,009 to Griffith discloses a bracket which is typically made of a rectangular strip of sheet metal. It is bent into a U-shape, having legs which touch one another along their length, such that a cylindrical channel is formed at the apex of the U-shape and a mounting section is formed by the adjoining legs of the U-shape. If it were threaded, the channel would be capable of accepting a bolt, but it could not dependably support a liquid carrying pipe since the channel is located to the side of the bracket mounting section.

U.S. Pat. Nos. 4,473,205 and 4,488,695, both issued to Rumble, disclose a pipe hanger wherein the ends of a strip of metal are stamped into semi-cylindrical sections with threads, and the strip is bent to form a saddle with the ends brought together to form a threaded bore for receiving a hanging rod. A separate fastener is needed to hold the threaded end sections of the metal strip together.

An improved side beam pipe hanging bracket is desired, and it is the object of the present invention to supply a lightweight, yet strong and easy to manufacture pipe hanging bracket.

SUMMARY OF THE INVENTION

The present invention provides a bracket which is mounted to a vertical surface of a horizontal beam, such as a ceiling beam. The bracket is formed from a flat strip of metal which is cut into a generally rectangular shape having a narrow, inverted-T-shaped slot extending from one of the long edges of the rectangle. The slot separates the bracket into a horizontal rod receiving segment and vertical hanging segments located at each end of the horizontal rod receiving segment. Each hanging segment has a mounting hole near its upper portion.

The center of the rod receiving segment is stamped with threads and bent into a generally curved shape, forcing the hanging segments to move laterally, toward one another an initial amount. The hanging segments are then moved further edgewise towards each other until they overlap one another. This motion causes the rod receiving segment to bend further such that the portions of the bracket where each end of the rod receiving segment meets a respective hanging segment bends into a connecting neck. When the hanging segments are aligned, one on top of the other, the neck of one segment abuts the neck of the other segment, causing the rod receiving segment to form a generally cylindrical threaded channel integral with the overlapped hanging segments. Thus, the bracket of the present invention has overlapping vertical hanging segments with a rod receiving channel protruding from the lower portion of the hanging segments.

The bracket is mounted on a vertical surface of a horizontal support via the holes in the overlapping hanging segments. Thus, the channel can threadedly accept a hanging rod from a pipe hanger such that a liquid carrying pipe is suspended from a support. The bracket is generally used in hanging pipe for fire sprinkler systems.

BRIEF DESCRIPTION OF THE DRAWINGS

FIG. 3 is a plan view of the flat bracket of the present invention after it has been cut to shape, but before it is bent into its finished shape.

FIG. 4 is a plan view of the bracket after threads are stamped into a rod receiving section.

FIG. 5 is a perspective view of the completed side beam pipe hanging bracket of the present invention.

FIG. 6 is a cross-sectional view of the bracket along line 6—6 in FIG. 5.

FIGS. 7a, 7b, and 7c schematically illustrate a method of mating the bracket of the present invention.

DETAILED DESCRIPTION OF THE INVENTION

Figures 1, 2:
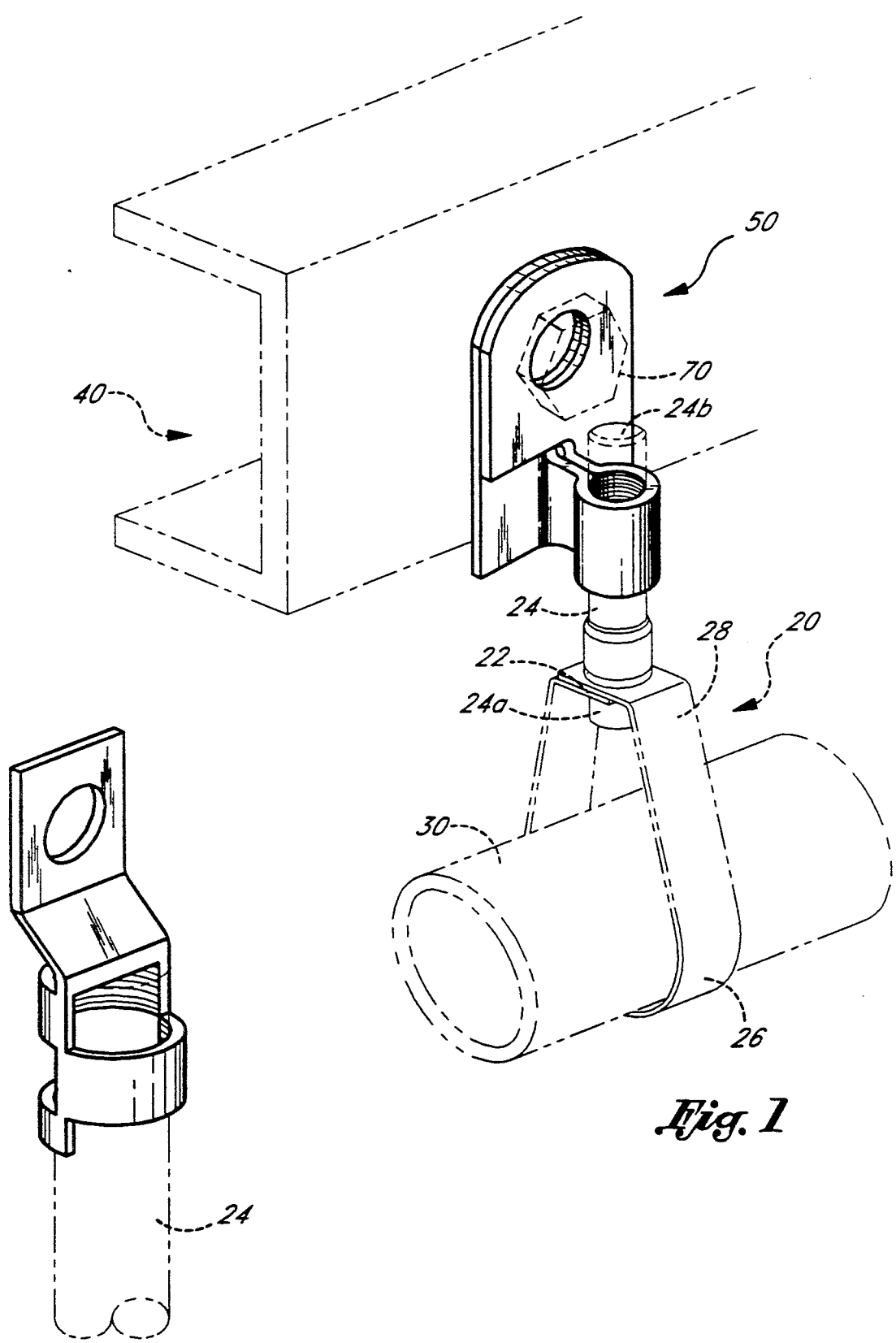
FIG. 1 is a perspective view of a prior art pipe hanger, suspending a liquid carrying pipe from a vertical surface of a horizontal support using the bracket of the present invention.
FIG. 2 is a perspective view of a prior art bracket.

FIG. 1 shows a typical prior art pipe hanger apparatus 20 suspending a liquid carrying pipe 30 from a vertical surface of a horizontal support 40 using the bracket 50 of the present invention. The pipe hanger 20 is made by bending a flat strip of metal, having two ends 22, into a teardrop shape and coupling the two ends 22 together. For example, this can be accomplished by bending the strip near the ends 22 such that a portion of each end 22 overlaps the other and coupling the overlapping ends 22 with a fastener such as a hanging rod 24. A lower portion of the pipe hanger forms a saddle 26 in which a liquid carrying pipe 20 rests. An upper portion of the pipe hanger forms a yoke 28, connecting the saddle 26 with a lower end 24a of a hanging rod 24 which extends through the overlapped ends 22 of the metal strip. An upper end 24b of the hanging rod 24 is threaded into and thereby restrained in the bracket 50 of the present invention.

The bracket 50, shown in FIGS. 3 through 6, is formed by cutting, stamping, and bending a flat strip of strong, bendable material. For example, pre-galvanized flat stock steel can be employed. The bracket 50 is generally rectangular, having an inverted-T-shaped slot 52 extending from approximately the center of an upper edge 50a of the bracket 50. This defines a rod hanging section 54 located adjacent the length of a horizontal leg 52a of the slot 52 and two hanging segments 56, located to each side of the vertical leg 52b of the slot 52. Each of the two hanging segments 56 has an upper section 56a and a lower section 56b, the upper edge 50a of the bracket 50 being the upper edge of each upper section 56a of each hanging segment 56. This upper section 56a is preferably curved as shown. The horizontal leg 52a of the inverted-T-shaped slot 52 is shorter than the width of the bracket 50, leaving a connecting portion 56c which joins the upper and lower sections 56a and 56b of each hanging segment 56. The connecting portion is about half the width of the section 56. A large circular hole 59 is found in the upper section 56a of each hanging segment 56, spaced downwardly from the curved upper edge 50a, and centrally positioned laterally.

A large central portion of the bolt hanging segment 54 is stamped with threads 55 and thereby bent into a shallow U-shape, as seen in FIG. 4. This operation forces the hanging segments 56 to move laterally edgewise toward one another into the space previously occupied by the vertical leg 52b of the inverted-T-shaped slot 52. The ends 55 of the horizontal leg 52a of the inverted-T-shaped slot 52 extend slightly past the threaded portion of the bolt hanging segment 54.

The hanging segments 56 are forced further in the edgewise lateral direction around vertical bend lines until the upper sections 56a overlie one another along a central plane, and the large circular holes 59 are aligned. This motion causes the rod receiving section 54 to bend further around vertical bend lines to form a cylindrical channel 62, as shown in FIG. 5, and in cross-section in FIG. 6. The ends 55 of the horizontal leg 52a of the inverted-T-shaped slot 52 which extend past the threaded portion of the rod receiving section 54 relieve stress induced as this lateral motion occurs by arching inwardly to form a neck 60, with the connectors forming the neck engaging each other. The threads previously stamped on the underside of the rod receiving segment 54 are thus impressed around the inner surface area of the cylindrical channel 62.

The ends 55 of the horizontal leg 52a of the slot 52 which extended past the threaded portion of the rod receiving segment 54 now form a small opening 64 located above the channel 62. A seam 66 (shown in FIG. 6), formed when the connectors forming the neck 60 abut at the rear of the channel 62, extends the length of the rear of the channel 62. In the formed bracket 50, the vertical hanging segments 56 overlap. A fastener 70 (shown in FIG. 1) is inserted through the holes 59, perpendicular to the overlapped hanging sections 56, to mount the bracket 50 to the vertical surface of a horizontal support 40, the cylindrical channel 62 is situated below but offset from the head of the fastener 70. That is, the neck 60 is longer than the thickness of the head of the fastener 70.

The rod is preferably inserted completely through the receiving channel until the top of the rod is at least flush with the top of the channel. Additionally, the hanging rod 24 can be inserted past the end of the channel 62 since there is no obstruction above the top of the channel 62. This allows easy adjustment of the hanging height of a liquid carrying pipe 30.

A further attribute of the bracket 50 of the present invention is that it can withstand non-vertical forces, or sideloading, due to its unique construction. The action of non-vertical forces, such as those that can be caused in an earthquake, most greatly affect the weakest areas of the bracket. In the present invention, the weakest areas are those areas 56c which connect the upper and lower portions 56a and 56b of the hanging segments 56. However, the width of these connecting areas 56c is substantial enough to ensure adequate strength even when sideloading forces are applied to the bracket 50.

Further ensuring the efficacy of the bracket 50 of the present invention is its reliable reaction to the application of extreme, downward, vertical forces on the channel 62. The seam 66 (shown in FIG. 6) at the back of the channel 62 can be compelled to shift apart when enough downward force is applied. After insertion of the hanging rod 24 into the channel 62, a heavy pipe will cause a hanging rod 24 to pull downwardly on the channel 62, causing torque on the walls of the channel 62. The torque causes the bottom of the channel 62 to separate while the top of the channel 62 constricts. Thus, the top of the channel 62 closes on the bracing rod 24, grabbing the bracing rod 24 and ensuring that it is retained in the channel 62.

One method of fabricating the bracket 50 of the present invention is in a progressive die. Referring to FIG. 7a, a flat strip 70 of resilient material is used, such as 14 gauge pre-galvanized steel. The metal strip enters a first station of the die and a section 50b of the strip is punched to form the generally rectangular shape with the inverted-T-shaped slot 52, as shown in FIG. 3, except that one side edge of the section remains attached to the remainder of the strip 70.

After the initial punching step, the strip 70 is advanced in the progressive die to a second station where threads 35 are stamped on the underside of the rod receiving section 54 of the strip section 50b, as shown in FIG. 7b. The process of stamping threads forces the center of the rod receiving segment 54 to move out of the plane of the flat bracket section 50b, which in turn forces the hanging segments 56 to move slightly laterally together. Thus, the rod receiving section 54 begins to curve and create the channel 62. At the same time, a second section 50c of the strip 70 has entered the first station of the progressive die. Thus, while the first bracket section 50b is being stamped with threads, a second bracket section 50c is being punched to form the inverted-T-shaped slot 52.

Next, referring to FIG. 7a, a the metal strip 70 is advanced such that the first bracket section 50b moves into a third station of the progressive die, the second bracket section 50c moves into the second station of the progressive die, and a third bracket section 50d moves into the first station of the progressive die. In the third station of the progressive die the hanging segments 56 of the first bracket 50b are moved further laterally until they overlap, thereby forming the channel 62, as described above and shown in FIG. 5. Also, the edge of the bracket 50b which remained attached to the metal strip 70 is now cut, completing the bracket 50b. Thus, at the same time the first bracket 50b in the third station of the progressive die is being bent, the second bracket 50c, in the second section of the progressive die, is being stamped with threads 35 and the third bracket 50d, in the first section of the progressive die, is being cut into the generally rectangular shape with an inverted-T-shaped slot 52. Performing different stages of manufacture on three adjacent strip sections simultaneously provides economy and efficiency of production. That is, even though there are three steps to the process, a bracket is formed with each reciprocation of the press holding the die set.

The bracket 50 of the present invention provides exceptional support while being lightweight, easy to manufacture, and inexpensive. Additionally, the bracket 50 provides assurance that a pipe will be supported if either a vertical or non-vertical force is applied. The bracket 50 exceeds the strength standards for the fire sprinkler industry, in which the bracket is to be principally used, while not being so bulky as to limit its practicality. Additionally, the dimensions of the bracket 50 can be scaled to allow its use in fields commanding greater strength requirements.

One skilled in the art will realize that the present invention can be manufactured from any suitable resilient material, including any gauge of metal sheet. Additionally, one skilled in the art will realize that the dimensions of the present invention are not limited to the dimensions described herein. The dimensions of the bracket of the present invention can be scaled to any appropriate dimensions to hold a given pipe hanger and given size liquid carrying pipe in a variety of different circumstances other than fire sprinkler systems.

What is claimed is:

1. A bracket to support a rod connected to a pipe hanger, said bracket comprising:
    a pair of thin flat hanging segments overlying each other along a central plane, said segments being adapted to be connected to an elevated, vertical support surface;
    a cylindrical rod receiving section having an axis that extends generally parallel to and spaced from said plane; and
    a neck connecting said section to said segments, said neck including a pair of connectors generally perpendicular to and extending away from said segments, with one connector formed integral with one circumferential end of said rod receiving section and one of said segments, and the other neck connector being formed integral with a second circumferential end of said rod receiving section and the other of said segments.

2. The bracket of claim 1 wherein the upper portion of each of said hanging segments is adapted to be mounted on said support surface and said neck is integral with the lower portion of said segments.

3. The bracket of claim 1 wherein said connectors are joined to said hanging segments and to said rod receiving section by bends about lines that extend generally parallel to the axis of said rod receiving section.

4. The bracket of claim 1 wherein the height of said rod receiving section is about one-third the overall height of said bracket.

5. The bracket of claim 1 wherein said rod receiving section is internally threaded to receive a threaded rod.

6. The bracket of claim 5 wherein said threads have a stamped configuration.

7. The bracket of claim 1 wherein said hanging segments each include a centrally located hole in its upper portion for mounting the bracket to said surface.

8. the bracket of claim 1 wherein said neck extends away from mid segments sufficiently such that a rod end threaded through and above said rod receiving section clears the head of a bracket mounting fastener extending through mid hole.

9. A bracket adapted to be mounted to an elevated support surface, said bracket having a generally flat hanger portion having its upper end adapted to be mounted to said surface; a cylindrical rod receiving section adapted to engage a rod; and a neck extending generally outward from the plane of said hanger portion, said neck extending between and connecting said hanger portion to the cylindrical exterior of said rod receiving section so that the neck does not interfere with insertion of a rod through said section.

10. The bracket of claim 9, wherein said rod receiving section has stamped threads on its interior adapted to threadably engage a threaded rod.

11. The bracket of claim 9, wherein said bracket is adapted to be mounted to a vertically-oriented support surface, wherein said cylindrical rod receiving section is also vertically oriented.

12. A bracket adapted to be mounted to an elevated support surface, said bracket comprising:
    a generally flat hanger portion adapted to be mounted to said surface;
    a cylindrical rod receiving section having a center axis extending through said section, said section being adapted to receive a rod; and a neck, connecting said hanger portion to said rod receiving section, said neck extending generally in a plane in which said axis lies.

13. The bracket of claim 12, wherein said hanger portion, rod receiving section and neck are integrally formed.

14. The bracket of claim 12, wherein said rod receiving section is internally threaded to receive a threaded rod.

15. The bracket of claim 12, wherein said hanger portion has a support hole having a center axis perpendicular to said hanger portion, said axis of said hole lying generally on the same plane in which said neck and said axis of said rod receiving section lie.

16. The bracket of claim 12, wherein said neck extends outward generally perpendicularly from the plane of said hanger portion.

17. The bracket of claim 16, wherein said hanger portion has disposed thereon a circular support hole above said neck.

18. The bracket of claim 17, wherein said neck extends outward such that a supporting fastener engaging said support hole does not interfere with a rod passing through said rod receiving section.

19. The bracket of claim 12, wherein said axis of said rod receiving section is substantially vertical.

20. The bracket of claim 19, wherein said bracket is adapted to be mounted to a vertically-oriented support surface.

21. A bracket adapted to be mounted to an elevated support surface, comprising:
   a flat hanger portion having a support hole for mounting said hanger portion to said elevated support surface, said hole having a center axis perpendicular to said hanger portion;
   a rod receiving section adapted to receive a rod; and
   a neck extending between and connecting said hanger portion to said rod receiving section, said neck extending generally in a plane in which said axis of said support hole lies.

22. The bracket of claim 21, wherein said rod receiving section has stamped threads on its interior adapted to threadably engage a threaded rod.

* * * * *